(12) United States Patent
Hamke et al.

(10) Patent No.: US 8,219,267 B2
(45) Date of Patent: Jul. 10, 2012

(54) WIND ESTIMATION FOR AN UNMANNED AERIAL VEHICLE

(75) Inventors: Eric E. Hamke, Albuquerque, NM (US); Dale F. Enns, Roseville, MN (US); Gregory R. Loe, Friendswood, TX (US); Roger A. Wacker, Houston, TX (US); Oliver Schubert, Albuquerque, NM (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 12/789,238

(22) Filed: May 27, 2010

(65) Prior Publication Data

US 2011/0295569 A1 Dec. 1, 2011

(51) Int. Cl.
*G06F 7/00* (2006.01)
(52) U.S. Cl. .................. 701/14; 703/2; 701/7
(58) Field of Classification Search .......... 701/1, 3, 701/7, 213–215, 220, 14; 703/2
See application file for complete search history.

(56) References Cited

U.S. PATENT DOCUMENTS

| | | | |
|---|---|---|---|
| 3,724,786 A | 4/1973 | Adams et al. | |
| 5,051,750 A | 9/1991 | Hollister | |
| 5,051,910 A | 9/1991 | Liden | |
| 6,405,107 B1 | 6/2002 | Derman | |
| 6,856,894 B1 | 2/2005 | Bodin et al. | |
| 7,249,730 B1 | 7/2007 | Flippen, Jr. | |
| 7,286,913 B2 | 10/2007 | Bodin et al. | |
| 7,299,130 B2* | 11/2007 | Mulligan et al. ............... | 701/213 |
| 7,509,212 B2 | 3/2009 | Bodin et al. | |
| 2004/0024500 A1 | 2/2004 | Campbell | |
| 2007/0077071 A1 | 4/2007 | Belenkiy | |
| 2008/0168835 A1 | 7/2008 | Lassouaoui et al. | |
| 2009/0326824 A1 | 12/2009 | Naumov et al. | |

OTHER PUBLICATIONS

Samar et al., "Embedded Estimation of Fault Parameters in an Unmanned Aerial Vehicle," Proceedings of the 2006 IEEE International Conference on Control Applications, Munich, Germany, Oct. 4-6, 2006, 6 pages.
Ceccarelli et al, "Micro UAV Path Planning for Reconnaissance in Wind," Proceedings of the 2007 American Control Conference, Marriott Marquis Hotel at Times Square, New York City, USA, Jul. 11-13,2007, 6 pages.
How et al., "Flight Demonstrations of Cooperative Control for UAV Teams," AIAA 3$^{rd}$ "Unmanned Unlimited" Technical Conference, Workshop and Exhibit, Sep. 20-23, 2004, Chicago, Illinois, 9 pages.
Vasconcelos et al., "Embedded UAV Model and Laser Aiding Techniques for Inertial Navigation Systems," Control Engineering Practice, 18 (Jan. 2010) 262-278.
European Search Report from counterpart EP Application No. 11156330.0, mailed May 15, 2012, 3 pages.

* cited by examiner

*Primary Examiner* — Yonel Beaulieu
(74) *Attorney, Agent, or Firm* — Shumaker & Sieffert, P.A.

(57) ABSTRACT

The speed of the wind during operation of a UAV is estimated. In one example the speed of the wind is estimated by modeling an acceleration of an unmanned aerial vehicle (UAV) based on a measured ground speed of the UAV, determining an actual acceleration of the UAV with one or more sensors, and estimating the speed of the wind as an integral of a difference between the modeled acceleration and the actual acceleration.

20 Claims, 6 Drawing Sheets

WIND ESTIMATION FOR AN UNMANNED AERIAL VEHICLE

STATEMENT REGARDING FEDERALLY SPONSORED RESEARCH OR DEVELOPMENT

This invention was made with Government support under W56HZV-05-C-0724 awarded by the United States Army Tank-Automotive and Armaments Command (TACOM). The Government has certain rights in the invention.

TECHNICAL FIELD

The disclosure relates to techniques for controlling aircraft, such as unmanned aerial vehicles, in flight.

BACKGROUND

An unmanned aerial vehicle (UAV) is an aircraft that flies without a human crew on board the aircraft. A UAV can be used for various purposes, such as the collection of ambient gaseous particles, observation, thermal imaging, and the like. A micro air vehicle (MAV) is one type of UAV, which, due to its relatively small size, can be useful for operating in complex topologies, such as mountainous terrain, urban areas, and confined spaces. The structural and control components of a MAV are constructed to be relatively lightweight and compact.

SUMMARY

In general, this disclosure is directed to devices, systems, and techniques for estimating the speed of the wind during operation of a UAV based on a modeled acceleration of the UAV in flight and an actual acceleration (e.g., a sensed acceleration) of the UAV in flight.

In one example, a method includes modeling an acceleration of an unmanned aerial vehicle (UAV) based at least on a measured ground speed of the UAV, determining an actual acceleration of the UAV with one or more sensors, and estimating a speed of the wind as an integral of a difference between the modeled acceleration and the actual acceleration.

In another example, a UAV includes a plurality of sensors connected to the UAV and a processor. The processor is configured to model an acceleration on the UAV based at least on a ground speed of the UAV measured based on data from at least one of the sensors, determine an actual acceleration of the UAV with at least one of the sensors, and estimate the speed of the wind as an integral of a difference between the modeled acceleration and the actual acceleration.

In another example, A computer-readable storage medium includes instructions for causing a programmable processor to model an acceleration of an unmanned aerial vehicle (UAV) based at least on a measured ground speed of the UAV, determine an actual acceleration of the UAV with one or more sensors, and estimate the speed of the wind as an integral of a difference between the modeled acceleration and the actual acceleration.

In another aspect, the disclosure is directed to an article of manufacture comprising a computer-readable storage medium. The computer-readable storage medium comprises computer-readable instructions for execution by a processor. The instructions cause a programmable processor to perform any part of the techniques described herein. The instructions may be, for example, software instructions, such as those used to define a software or computer program. The computer-readable medium may be a computer-readable storage medium such as a storage device (e.g., a disk drive, or an optical drive), memory (e.g., a Flash memory, read only memory (ROM), or random access memory (RAM)) or any other type of volatile or non-volatile memory that stores instructions (e.g., in the form of a computer program or other executable) to cause a programmable processor to perform the techniques described herein.

The details of one or more examples are set forth in the accompanying drawings and the description below. Other features, objects, and advantages of the disclosed examples will be apparent from the description and drawings, and from the claims.

DETAILED DESCRIPTION

In order to control the trajectory of a MAV in flight, the state of the vehicle, e.g. attitude, velocity, forces, moments, etc., is modeled by avionics on board the MAV based on measured values, as well as, in some cases, data generated by pre-flight simulations and/or testing. One variable employed in such models of the state of the MAV in flight is the speed of the vehicle. In some examples, avionics onboard a MAV may only measure and/or derive the ground speed of the vehicle, versus the true air speed of the vehicle. Employing the ground speed in the model of the MAV may reduce the accuracy of the vehicle model. The true air speed, sometimes referred to simply as the air speed, is the speed of the MAV relative to the air through which the vehicle is traveling. In contrast to the air speed, the ground speed of the MAV is the speed of the vehicle relative to the ground. The difference between the true air speed and the ground speed of MAV 10 can be attributable to the speed of the wind, and, in some examples, may be substantially equal to the speed of the wind. In other words, in some examples, the speed of the vehicle used in the model of the state of MAV does not account for the influence of wind on the vehicle in flight.

In order to more accurately model the state of the MAV in flight, the true air speed of the vehicle may be measured by one or more sensors. However, measuring the true air speed of the MAV may include additional components, e.g. an air speed sensor, which may add cost and complexity to the vehicle. As such, examples according to this disclosure derive an estimate of the true air speed of a MAV, and other unmanned aerial vehicles (UAV), by estimating the wind speed and adding the estimated wind speed to a measurement of the ground speed of the vehicle. The wind speed during operation of the MAV is estimated by integrating the difference between an actual acceleration on the vehicle sensed by onboard sensors, e.g. one or more accelerometers, and the acceleration on the vehicle modeled based on, among other parameters, a measurement of the ground speed of the vehicle in flight. While MAVs are primarily referred to herein, the devices, systems, and techniques for estimating the speed of the wind during operation of a vehicle are applicable to any suitable UAV.

While an operator of a MAV may control a trajectory of the MAV to compensate for trajectory deviations that are attributable to wind, it may be desirable for the MAV to automatically control its trajectory with little to no operator input. The wind estimates described herein may be useful for automating control of the MAV flight and position, even in windy conditions. A better control of the vehicle trajectory may be useful for, for example, reducing the need of an operator to correct for the MAV's drift in the wind. This may reduce the amount of experience required to fly the MAV in windy conditions, as well as reduce training time for the operator.

In some examples, a UAV, such as a MAV, includes an onboard camera that captures images of an object of interest. Because techniques described herein may be useful for maintaining the MAV in a particular position and/or attitude by implementing the wind estimation techniques described herein, the camera aboard the MAV may be able to capture better images. For example, an improved ability of the MAV to hold its attitude and position may enable the camera aboard the MAV to use greater magnification levels, which may allow the MAV to stand off further from the object of interest and/or permit the operator to get a better view of the object of interest.

Figure 1:
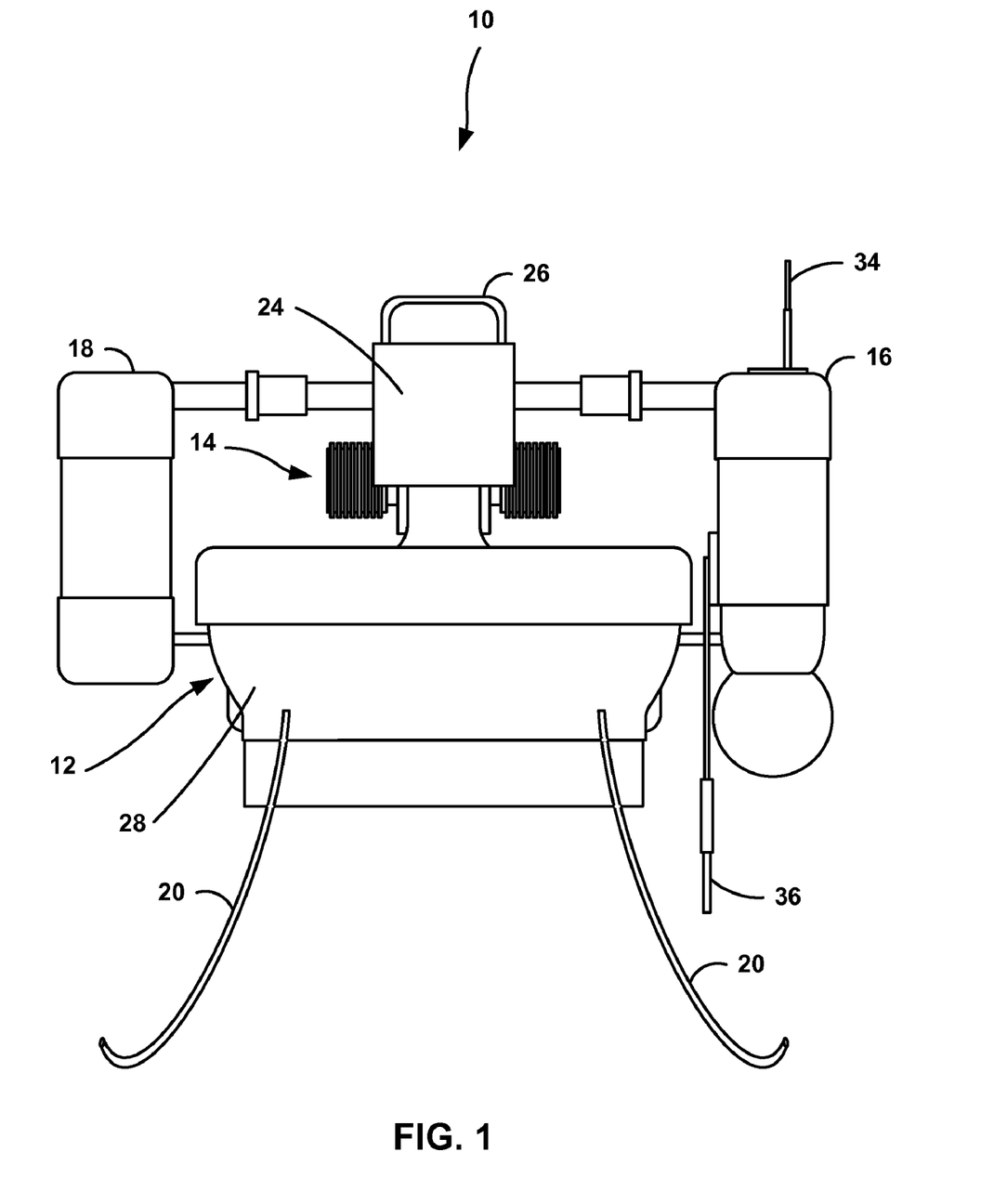
FIG. 1 is an elevation view of an example MAV.

FIG. 1 is an elevation view of an example MAV 10 including ducted fan 12, engine 14, pods 16 and 18, landing gear 20, and fuel bladder 22. In FIG. 1, engine 14 is located toward the inlet end of ducted fan 12 and mechanically connected (either directly or indirectly) to the ducted fan. Pods 16 and 18 are offset laterally and connected to central console 24 that includes engine 14 and handle 26. In the example shown in FIG. 1, four landing gears 20 (only two are shown in the view of FIG. 1) are connected to ducted fan 12.

Engine 14 is operatively connected to and configured to drive ducted fan 12. In the example shown in FIG. 1, engine 14 is a reciprocating engine, and, in particular, a two cylinder internal combustion engine. However, other example MAVs may include other types of engines including, e.g., a gas turbine engine or electric motor. Engine 14 may be operatively connected to ducted fan 12 via an energy transfer apparatus, such as, but not limited to, a differential.

Ducted fan 12 includes duct 28, a rotor fan (not shown in FIG. 1). In some examples, ducted fan 12 will include both a rotor fan and stator fan. In such examples, the rotor fan, stator fan, and tail cone 30 may be arranged axially in the direction of flow through ducted fan 12 from an inlet side of the duct to an outlet. In operation, the rotor fan of ducted fan 12 rotates to draw a working medium gas including, e.g., air, into duct inlet 28a. The working medium gas is drawn through the rotor fan, directed by the stator fan and accelerated out of duct outlet 28b around tail cone 30. The acceleration of the working medium gas through duct 28 generates thrust to propel MAV 10 and control vanes 32 may be manipulated to direct the MAV along a particular trajectory, i.e., a flight path. In this manner, engine 14 drives ducted fan 12 to propel MAV 10 in flight. Duct 28 of ducted fan 12 may be formed of any suitable material including, e.g., various composites, aluminum or other metals, a semi rigid foam, various elastomers or polymers, aeroelastic materials, or even wood.

Although MAV 10 depicted in FIG. 1 includes one ducted fan 12, the number of ducted fans may vary in other example vehicles. In one example, a MAV may include two or more ducted fans 12. Various other features may also vary in other embodiments. In examples including an even number of ducted fans 12, each of the fans may be aligned side-by-side along a lateral plane (e.g., extending in a plane perpendicular to the plane of the image shown in FIG. 1).

Pods 16 and 18 of MAV 10 may include, e.g., avionics and payload pods. In one example, pod 16 may be configured to carry an avionics package including, e.g., avionics for communicating to and from MAV 10, navigating the MAV, as well as flight control electronics and sensors. In the example of FIG. 1, pod 16 also includes communications antennae 34, 36, which may be configured for radio and video communications, respectively, to and from MAV 10. Additionally, pod 18 may be configured to transport various types of payloads for any number of missions for MAV 10, including, e.g., objects to be dropped or placed by the MAV. In some examples, pods 16, 18 can also be switched, such that pod 16 includes a payload and pod 18 includes avionics.

Landing gear 20 of MAV 10 are formed as elongated rods with curved feet configured to engage a landing surface and may be fabricated from a variety of materials including metals, plastics, and composites. In some examples, landing gear 20 may be fabricated from one or more materials that exhibit some inherent resiliency to cushioning the MAV during landings. Other example MAVs may include fewer or more landing gear 20, which may be connected to different components of the vehicle than shown in the example of FIG. 1.

In the example of FIG. 1, MAV 10 may also include one or more sensors and handle 26. In some examples, sensors may be attached, e.g., to avionics pod 16, and configured to sense objects and/or other conditions surrounding MAV 10 and to facilitate operation thereof. For example, MAV 10 may include sensors that sense the attitude and air speed of the vehicle, as well as ambient air pressure and temperature. MAV 10 may have sensors disposed in other positions relative to the components of the vehicle. For example, pressure sensors may be mechanically connected to and distributed around a lip of duct 28 of ducted fan 12 (e.g., evenly or unevenly space around the lip of duct 28).

Handle 26 is attached to, coupled to, or formed integral with central console 24 that includes engine 14. Handle 26 may generally be used to move MAV 10 off of a starter after engine 14 of the aircraft is running Handle 26 may also be configured to assist with capture of MAV 10, for example, by being engaged by a non-depicted capture device. In the example depicted in FIG. 1, handle 26 protrudes out from central console 24. However, in other examples, handle 26 may be implemented as a pocket or other recess in central console 24. In addition, in some examples, MAV 10 does not include handle 26.

Figure 2:
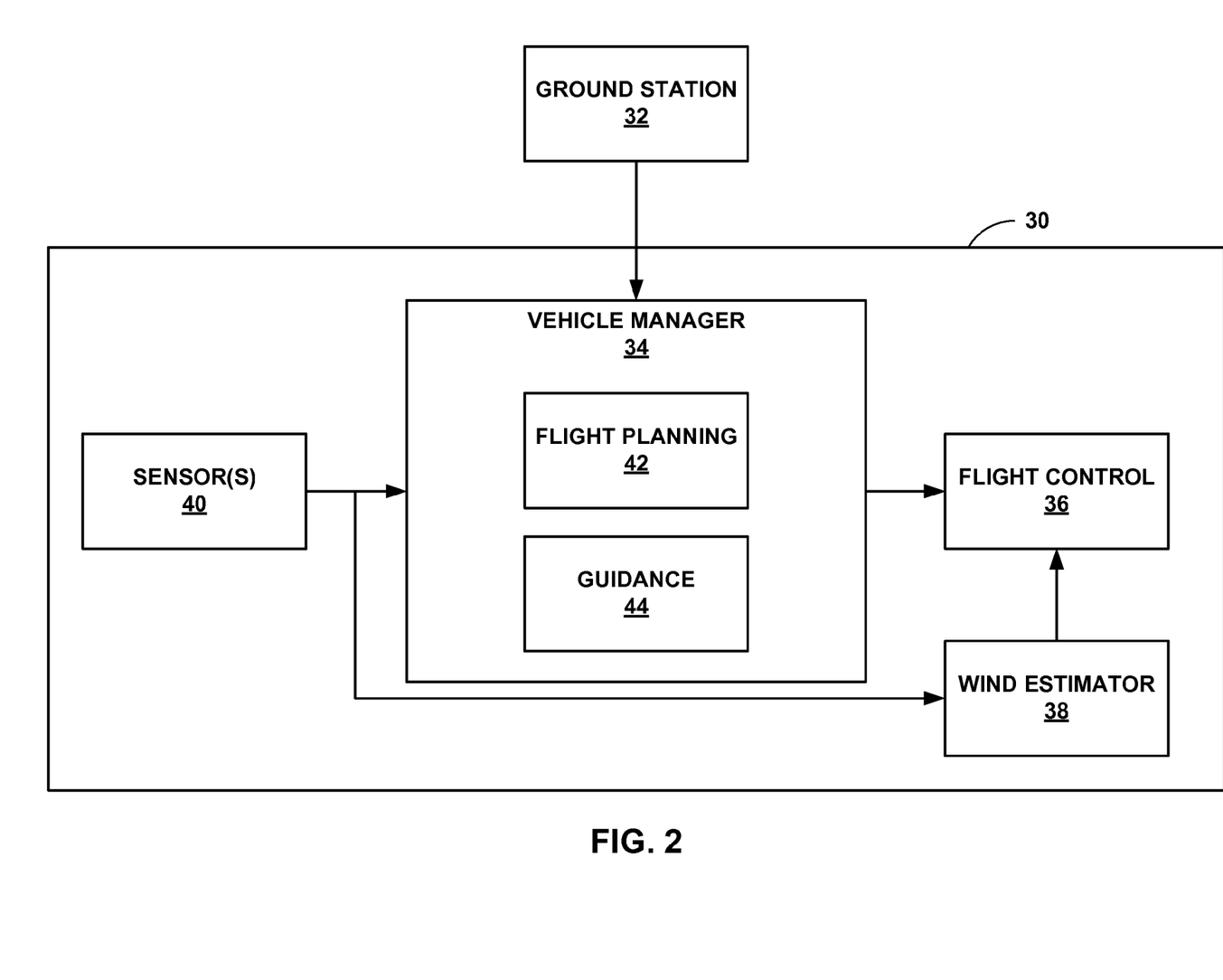
FIG. 2 is a block diagram of an example avionics system onboard the MAV of FIG. 1.

FIG. 2 is a block diagram illustrating example avionics 30 on board MAV 10, e.g. in payload pod 16 of MAV 10. The example of FIG. 2 illustrates avionics 30 communicatively connected with remote ground station 32. Ground station 32 may, e.g., be the location from which a remote pilot issues commands to control the operation of MAV 10 in flight. Avionics 30 on board MAV 10 and ground station 32 may be in communication via a variety of wireless communication technologies, including, e.g., terrestrial or satellite wireless communications.

The remote ground station 32 can be used to develop a flight plan for MAV 10, which is then uploaded by the operator to the MAV. Ground station 32 may also allow the operator to send manual steering commands to MAV 10, which, in turn, allows the operator to direct the vehicle in flight. In some examples, ground station 32 receives imagery and vehicle status from MAV 10, which may be displayed to operators at the ground station. Ground station 32 may also used to send sensor steering commands that allow the operator to, e.g., change the field of view of a video camera onboard MAV 10 and allows the operator to obtain imagery relevant to the current vehicle mission. In one example, communication between ground station 32 and MAV 10 includes lost link responses. Prior to a loss of radio link between MAV 10 and ground station 32 the operator can select an automatic reaction of the MAV in the event radio communications are lost. In one example, setting lost link responses between ground station 32 and MAV 10 takes place during pre-flight procedures. Automatic responses that operators may select for MAV 10 to a lost link include vehicle landing, gaining altitude, or retracing a route.

Example avionics 30 of FIG. 2 includes vehicle manager 34, flight control 36, wind estimator 38, and sensors 40. As noted above, ground station 32 is communicatively connected to avionics 30. Ground station 32 is configured to issue commands to and receives information from avionics 30 via vehicle manager 34. Vehicle manager 34 includes flight planning 42 and guidance 44. Flight planning 42 manages the interface with ground station 32 and processes and converts commands from the ground station, e.g. operator commands, for use by flight control 36. Guidance 44 may process flight path information, including, e.g., waypoints supplied by ground station 32, i.e., a remote pilot operating MAV 10 and create a three-dimensional trajectory for MAV to follow during a mission. In some examples, guidance 44 may periodically check the state of MAV 10, e.g., position, velocity, attitude, and the like, against the three-dimensional flight path and issue commands to flight control 36 to keep the MAV on the trajectory. An operator at ground station 32 may, in some examples, override guidance 44 and take over manual control of MAV 10. In such examples, flight planning 42 takes over to process commands from ground station 32 for use by flight control 36 to direct MAV 10 as commanded by the ground station operator. Vehicle manager 34 controls when guidance 44 is used and when flight planning 42 takes over guidance so that, e.g., a pilot may control the flight of MAV 10 directly.

Flight control 36 interfaces with MAV 10, e.g., engine 14, ducted fan 12, control vanes, and other components to control the flight of the MAV according to, e.g. an autonomous flight plan issued by ground station 32 and executed by guidance 44, or operator issued manual flight commands controlled and managed by flight planning 42. Whether via flight planning 42 or guidance 44, flight control 36 receives data from sensors 40. In some examples, sensors 40 may provide one or more of inertial data, e.g., from one or more gyroscopes onboard MAV 10, position and velocity data from an onboard Global Positioning System (GPS), vehicle acceleration data, e.g., via one or more accelerometers, and altitude data, e.g., via a barometer. Flight control 36 receives data from sensors 40, commands from flight planning 42 or guidance 44, and issues commands to components of MAV 10, e.g. engine 14 and control vanes included in ducted fan 12 to control the flight of the MAV. In some examples, data received by flight control 36 from sensors 40 may be processed before reaching the flight control, including, e.g., processing inertial, GPS, altitude, and acceleration data through implementation of a navigation solution to determine, e.g., the speed, position, attitude, and the like of MAV 10 based on the raw data received from the onboard sensors.

In order to control the flight of MAV 10, e.g., via an autonomous flight plan issued by ground station 32 and executed by guidance 44, or operator issued manual flight commands controlled and managed by flight planning 42, flight control 36 may execute an algorithm that models the actual state of the MAV at a given time, e.g. position, velocity, attitudes, accelerations, and the like, and issues commands to, e.g., engine 14 and control vanes of ducted fan 12, that will cause the MAV to maintain or correct the flight trajectory defined by commands issued by vehicle manager 34. In some examples, flight control 36 models the current state of MAV 10 in flight by modeling the forces and moments on the MAV as a function of a number of different measured or derived parameters, including, e.g., the rotational speed of the fan of ducted fan 12 in, e.g., revolutions per minute (RPM), the speed of the MAV, the orientation of the vehicle, and the position of the control vanes of the ducted fan. For example, flight control 36 may model the forces, F, and moments, M, on MAV 10 according to the following formula.

$$[F\ M] = f(\omega, S, \theta, \phi, d_n) \qquad (1)$$

In the foregoing formula of the example vehicle model employed by flight control 36, $\omega$ is the fan speed in, e.g., RPMs of ducted fan 12, S is the speed of MAV 10 in flight, and $\theta$ and $\phi$ are the polar angles defining the direction along which the MAV is traveling at the speed, S. Additionally, $d_n$ are the deflections of n control vanes of ducted fan 12 of the MAV that control the pitch, roll, and yaw angles of the MAV to direct the vehicle through the air in flight.

One challenge in accurately modeling the state of MAV 10 in flight is the ability to base the vehicle models on the true air speed, $S_{true}$, versus the ground speed, $S_{ground}$, of the vehicle. The true air speed, sometimes referred to simply as the air speed, is the speed of MAV 10 relative to the air through which the vehicle is traveling. In contrast to the air speed, the ground speed of MAV 10 is the speed of the vehicle relative to the ground. The difference between the true air speed and the ground speed of MAV 10 is attributable to the speed of the wind. In some examples, the difference between true air speed and the ground speed of MAV 10 is substantially equal to the speed of the wind, such that:

$$S_{true} = S_{ground} + S_{wind}. \qquad (2)$$

In some examples, avionics 30 of MAV 10 may only determine, e.g., by measuring and/or deriving, the ground speed of the vehicle. For example, flight planning 42 or guidance 44 and/or flight control 36 of avionics 30 may employ inertial measurement, GPS, vehicle altitude, and acceleration data from sensors 40 to determine the speed of MAV 10. In an ideal system including acceleration sensors, e.g. one or more accelerometers of sensors 40, which sense the actual acceleration of MAV 10 in flight, flight control 36 could integrate the accelerometer data once to determine the speed of the MAV and integrate the accelerometer data twice to determine the position of the MAV. However, due to sensor errors it may be useful to correct the sensed acceleration data with other inputs to accurately determine the speed of MAV 10 over time. As such, in one example, flight control 36 may employ inertial, GPS, and vehicle altitude data from sensors 40 in conjunction with vehicle acceleration data to determine the speed of MAV 10. As noted above, raw data received from sensors 40 may be processed by a navigation solution included in avionics 30 of MAV 10. In one example, the navigation solution may include a Kalman filter that augments data from, e.g., one or more accelerometers of sensors 40 with, e.g., gyroscope inertial, GPS, and barometer altitude data to determine the speed of MAV 10 in flight, as well as, in some examples, the position, attitude, and rotational rates of the vehicle.

The speed of MAV 10 derived from inertia, GPS, altitude, and acceleration sensor data from sensors 40 may not account for the speed of the wind, $S_{wind}$, and may therefore only represent the ground speed, $S_{ground}$, of the vehicle. In order to more accurately model the state of MAV 10 in such instances, the true air speed, $S_{true}$, of the vehicle may be sensed or derived. However, sensing the true air speed of MAV 10 may include additional components, e.g., an air speed sensor, which may add cost and complexity to the vehicle. As such, examples according to this disclosure derive an estimate of the true air speed of MAV 10, and other UAVs, by estimating the wind speed and adding the estimated wind speed to a measurement of the ground speed of the vehicle.

In one example, flight control 36 of MAV 10 executes an algorithm to determine the actual state of the MAV based on, among other parameters, an estimate of the true air speed, $S_{true}$, of the vehicle in flight. For example, flight control 36 may model the forces, F, and moments, M, on MAV 10 according to the following formula.

$$[F\ M]=f(\omega,S_{true},\theta,\phi,d_n) \quad (3)$$

In the foregoing example model employed by flight control 36, the rotational speed, $\omega$, of the fan of ducted fan 12 in, e.g., RPMs and the deflections, $d_n$, of n control vanes of ducted fan 12 of the MAV that control the pitch, roll, and yaw angles of the MAV to direct the vehicle through the air may be directly controlled by flight control 36 and may therefore be known values. The polar angles $\phi$ and $\theta$, which define the direction along which MAV 10 travels at the true air speed, $S_{true}$, may be determined based on the attitude of the MAV in flight. As such, the polar angles $\phi$ and $\theta$ may be determined using data from sensors 40, including, e.g., inertial sensors like gyroscopes, which may be indicative the attitude of MAV 10 in the air during flight.

The true air speed, $S_{true}$, of MAV 10, however, may, in some examples, only be estimated by flight control 36 as a function of a measurement of the ground speed, $S_{ground}$, of the vehicle derived based on data from sensors 40 and an estimate of the speed of the wind, $S_{wind}$. As noted above, it may not be desirable or practical to directly measure the speed of the wind during operation of MAV 10 using a separate wind sensor. As such, in order to determine the true air speed, $S_{true}$, of MAV 10 it may be necessary to estimate the speed of the wind, $S_{wind}$.

In order to estimate the speed of the wind, $S_{wind}$, during flight of MAV 10, flight control 36 may calculate the integral of the difference between a modeled acceleration on the MAV and an actual acceleration on the MAV sensed by one or more accelerometers mounted on the vehicle. In one example, flight control 36 may be configured to model the forces and moments on MAV 10 as a function of a number of different measured or derived parameters, including, e.g., parameters measured or derived based on data from sensors 40. However, because the data from sensors 40 may not, in some examples, account for the speed of the wind, $S_{wind}$, the model of the forces and moments on MAV 10 executed by flight control 36 may be based on the ground speed, $S_{ground}$, of the vehicle instead of the true air speed, $S_{true}$. As such, in one example, flight control 36 models the forces, F, and moments, M, on MAV 10 based on, among other parameters, the ground speed, $S_{ground}$, of the vehicle according to the following formula.

$$[F\ M]=f(\omega,S_{ground},\theta,\phi,d_n) \quad (4)$$

The rotational speed, $\omega$, of the fan of ducted fan 12 and the deflections, $d_n$, of n control vanes of ducted fan 12 may, as noted above, be known values based on the current operating state of MAV 10 and the polar angles $\phi$ and $\theta$ may be determined using data from sensors 40, including, e.g. inertial sensors like gyroscopes, which may be indicative the attitude of MAV 10 in the air during flight. Additionally, avionics 30 of MAV 10 may measure and/or derive the ground speed, $S_{ground}$, of the vehicle. For example, flight planning 42 or guidance 44 and/or flight control 36 of avionics 30 may employ inertial, GPS, vehicle altitude, and acceleration data from sensors 40 to determine the speed of MAV 10 in flight. However, the speed of MAV 10 derived from inertia, GPS, altitude, and acceleration sensor data from sensors 40 may not account for the speed of the wind, $S_{wind}$, and may therefore only represent the ground speed, $S_{ground}$, of the vehicle.

While it may be possible to model the forces, F, and moments, M, on MAV 10 analytically, in one example, flight control 36 employs look-up tables to determine the forces and moments on the vehicle. For example, flight control 36 or another part of avionics 30 of MAV 10 may include memory on which look-up tables organizing and cross-referencing different data related to the vehicle may be stored. For example, an array of force and moment values may be stored in one or more look-up tables stored on memory of flight control 36, which are correlated to particular flight conditions. For example, for a given rotational speed, $\omega$, of the fan of ducted fan 12, deflections, $d_n$, of n control vanes of ducted fan 12, attitude of MAV 10 expressed as polar angles $\phi$ and $\theta$, and ground speed, $S_{ground}$, of the MAV, reference to the look-up tables by flight control 36 may return particular values for the forces and moments on the MAV.

The data that populates the look-up tables employed by flight control 36 may be generated from one or more simulations or tests of MAV 10 in a variety of different flight conditions. For example, the look-up tables employed by flight control 36 to model the forces, F, and moments, M, on MAV 10 may be populated with data that results from one or more linear numerical and/or non-linear analytical simulations of the MAV in different flight conditions. In another example, in addition to or in lieu of the simulations, the look-up tables employed by flight control 36 to model the forces, F, and moments, M, on MAV 10 may be populated with data that results from wind tunnel testing of the MAV. In any event, during operation of MAV 10 flight control 36 may, in one example, determine modeled forces, F, and moments, M, on the MAV by referencing a look-up table to retrieve the force and moment values that correspond to the current rotational speed, $\omega$, of the fan of ducted fan 12, deflections, $d_n$, of n control vanes of ducted fan 12, attitude of the MAV expressed as polar angles $\phi$ and $\theta$, and ground speed, $S_{ground}$, of the MAV.

As the mass of MAV 10 may generally be a known value, a model of the accelerations on the MAV may be calculated by flight control 36 from the modeled forces and moments. For example, a modeled acceleration, $\hat{a}$, is equal to a modeled force, F, divided by the mass, m, of the MAV. In another example, a modeled acceleration, $\hat{a}$, is equal to a modeled moment, M, divided by the mass, m, of MAV 10 multiplied by a moment arm, r, about which the moment is applied to the vehicle. In general, therefore, the modeled acceleration, $\hat{a}$, on MAV 10 may be determined based on the modeled forces and moments on the vehicle according to the following formula.

$$\hat{a}=g(F,M,m,r) \quad (5)$$

Sensors 40 onboard MAV 10 may include one or more accelerometers, such as three-axis accelerometers or a plurality of single axis accelerometers, a two-axis accelerometer or any combination thereof, capable of detecting static orientation of MAV 10 or vectors in three-dimensions. In one example, sensors 40 of MAV 10 include one or more multi-axis micro-electro-mechanical accelerometers that are configured to generate signals indicative of the actual acceleration, $\tilde{a}$, on the MAV in multiple directions, e.g., x, y, and z directions of a vehicle coordinate system.

Based on the modeled acceleration, â, on MAV 10 and the actual acceleration, ã, on the vehicle sensed by one or more onboard accelerometers of sensors 40, an estimate of the wind, $\hat{S}_{wind}$, may be determined according to the following formula.

$$\hat{S}_{wind} = \int (\tilde{a} - \hat{a}) dt \qquad (6)$$

After estimating the speed of the wind, the true air speed of MAV 10 may be estimated by flight control 36 by adding the estimated wind speed to a measurement of the ground speed of the vehicle. The ground speed of MAV 10 may be determined by flight planning 42 or guidance 44 and/or flight control 36 of avionics 30 based on inertial, GPS, vehicle altitude, and acceleration data from sensors 40. As such, in one example, flight control may estimate the true air speed, $\hat{S}_{true}$, of MAV 10 according to the following formula.

$$\hat{S}_{true} = S_{ground} \hat{S}_{wind} \qquad (7)$$

In summary, therefore, flight control 36 of MAV 10 may, in one example, estimate the true air speed, $\hat{S}_{true}$, of the vehicle based on an estimate of the wind speed, $\hat{S}_{wind}$, and a measurement of the ground speed, $S_{ground}$, e.g., derived from inertial, GPS, altitude, and acceleration data received from sensors 40. The estimated true air speed of MAV 10 may be employed by flight control 36 to more accurately model the forces and moments on the vehicle in flight, which, in turn, enables improved control of the trajectory of the MAV during a mission. The speed of the wind during operation of MAV 10 may be estimated by flight control 36 by measuring the acceleration on the vehicle using, e.g., one or more multi-axis accelerometers. Flight control 36 may also model the forces and moments on MAV 10 based on, among other parameters, a measurement of the ground speed of the vehicle. From the modeled forces and moments, flight control 36 may determine a model of the acceleration on MAV 10. Flight control 36 may then determine an estimate of the speed of the wind during operation of MAV 10 as the integral of the difference between the actual acceleration on the vehicle sensed by sensors 40, e.g., one or more accelerometers, and the accelerations on the vehicle modeled based on, among other parameters, a measurement of the ground speed of the vehicle in flight.

The functions attributed to one or more components of avionics 30 of MAV 10, e.g., vehicle manager 34, flight control 36 and wind estimator 38, may be carried out by different combinations of hardware, firmware, and software components in various configurations. For example, avionics 30 of MAV 10 may include one or more programmable processors configured to execute instructions on and retrieve data from and store data on a memory to carry out one or more functions attributed to the avionics in this disclosure. The processors employed to execute the functions of avionics 30 may each include one or more processors, such as one or more microprocessors, digital signal processors (DSPs), application specific integrated circuits (ASICs), field programmable gate arrays (FPGAs), programmable logic circuitry, and the like, either alone or in any suitable combination.

The memory of the computing device or devices on which avionics 30 is implemented may include separate memories for storing programming instructions, flight plans, and sensor data, and any other information used by avionics 30 or another system connected to or associated with MAV 10. In this manner, the memory of the computing device or devices on which avionics 30 is implemented may store, e.g., data from sensors 42 and flight plans received from ground station 32. As mentioned above, in some examples, the memory of the computing device or devices on which avionics 30 is implemented stores program instructions that, when executed by a processor, cause the avionics to perform the functions attributed to the system in this disclosure. The memories described herein can each include any suitable configuration, such as random access memory (RAM), read-only memory (ROM), non-volatile random access memory (NVRAM), electrically erasable programmable read-only memory (EEPROM), FLASH memory, magnetic data storage media, optical data storage media, or the like.

Figure 3:
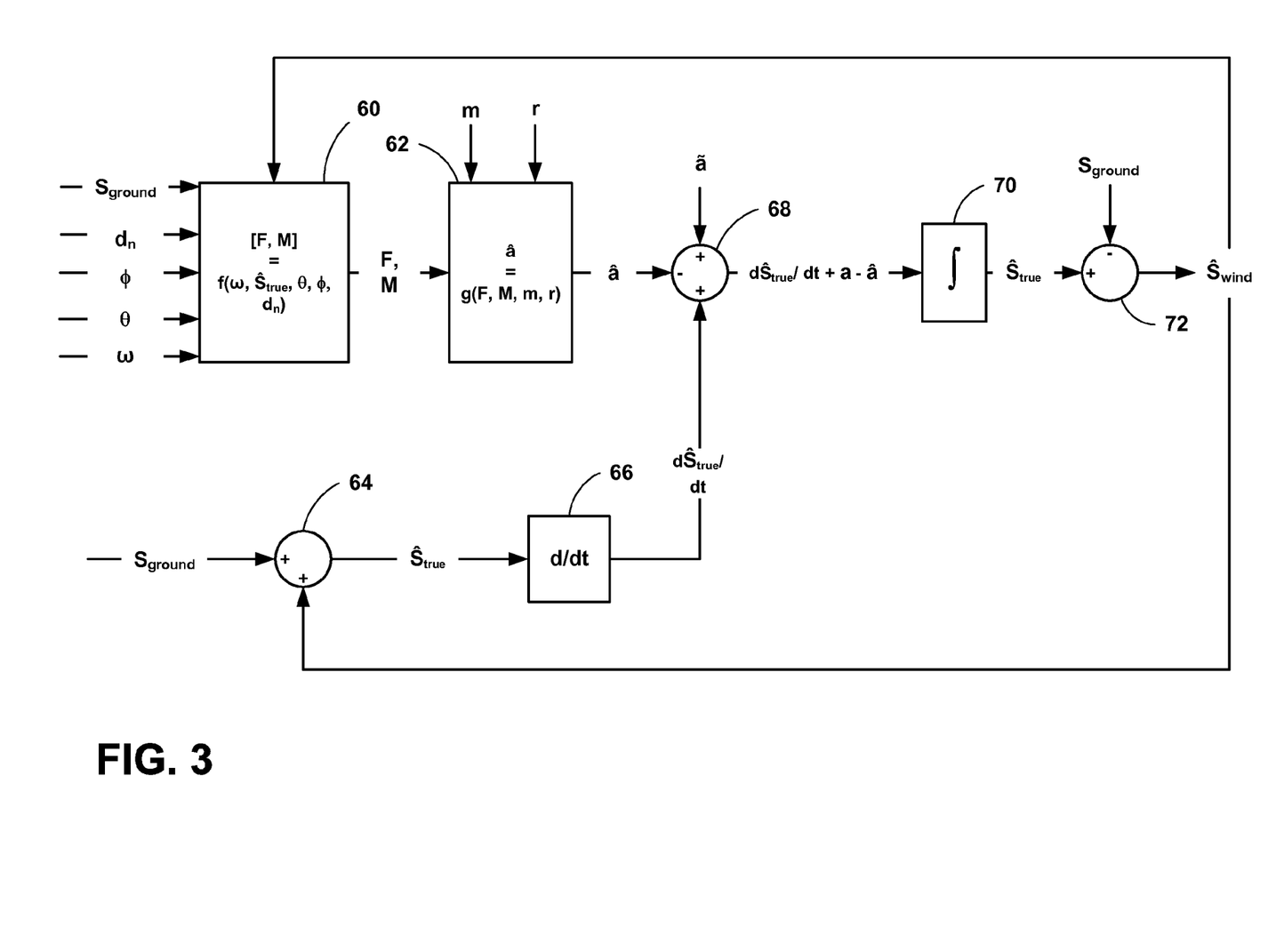
FIG. 3 is a schematic illustration of an example algorithm that may be executed by an avionics system onboard a MAV to estimate the speed of the wind during operation of the MAV.

FIG. 3 is a system diagram of an example algorithm that may be executed by flight control 36 of avionics 30 onboard MAV 10 to estimate the speed of the wind during operation of the MAV. Employing the example algorithm of FIG. 3, flight control 36 cycles through calculations to repeatedly estimate the speed of the wind during operation of MAV 10. In FIG. 3, flight control 36 executes function block 60 to model the forces, F, and the moments, M, on MAV 10 during flight as a function of a number of different parameters. Inputs to function block 60 executed by flight control 36 include the ground speed, $S_{ground}$, of MAV 10 derived from, e.g., inertial, GPS, altitude, and acceleration data received from sensors 40, the rotational fan speed, ω, of ducted fan 12, the polar angles, θ and φ, defining the direction along which the MAV is traveling at the ground speed, $S_{ground}$, and the deflections, $d_n$, of n control vanes of ducted fan 12 of the MAV that control the pitch, roll, and yaw angles of the MAV to direct the vehicle through the air in flight.

Flight control 36 models the forces and moments on MAV 10 at function block 60 as a function of an estimate of the true air speed, $\hat{S}_{true}$, of the MAV in flight. As such, flight control 36 uses as inputs to function block 60 not only the measured ground speed, $S_{ground}$, of MAV 10, but also an estimate of the wind speed, $\hat{S}_{wind}$, from the previous time step through the algorithm of FIG. 3. Flight control 36 may then calculate the estimated true air speed, $\hat{S}_{true}$, of MAV 10 for use in the model of function block 60 as equal to the sum of the current measurement of the ground speed, $S_{ground}$, of the vehicle and the estimate of the speed of the wind, $\hat{S}_{wind}$, from the previous cycle through the algorithm of FIG. 3. In one example, flight control 36 may assume the estimate of the speed of the wind is equal to zero in the first cycle through the algorithm of FIG. 3. In another example, flight control 36 may assume the estimate of the speed of the wind is equal to some nominal non-zero value in the first cycle through the algorithm of FIG. 3.

In the example algorithm of FIG. 3, the forces, F, and moments, M, on MAV 10 modeled at function block 60 may be used by flight control 36 to model the acceleration, â, on the vehicle at function block 62. In addition to the forces, F, and moments, M, on MAV 10 modeled at function block 60, flight control 36 uses the mass, m, of the MAV and one or more moment arms, r, about which the modeled moments are applied to the vehicle to calculate the modeled acceleration, â, on the MAV at function block 62 of the example algorithm of FIG. 3. For example, flight control 36 may calculate a modeled acceleration, â, as equal to a modeled force, F, divided by the mass, m, of the MAV. In another example, flight control 36 may calculate a modeled acceleration, â, as equal to a modeled moment, M, divided by the mass, m, of MAV 10 and a moment arm, r, about which the moment is applied to the vehicle.

At summing block 64 in FIG. 3, flight control 36 determines an estimate of the true air speed, $\hat{S}_{true}$, of MAV 10 in flight. In a similar manner to that described with reference to function block 60, at summing block 64, flight control 36 may determine the estimated true air speed, $\hat{S}_{true}$, of MAV 10 to be substantially equal to the sum of the current measurement of the ground speed, $S_{ground}$, the vehicle derived from, e.g., data from sensors 40 and the estimate of the speed wind, $\hat{S}_{wind}$, from the previous cycle through the algorithm of FIG. 3. As noted above, flight control 36 may assume the estimate of the speed of the wind is equal to zero, or, alternatively, is equal to some nominal non-zero value in the first cycle through the algorithm of FIG. 3. In any event, in the example of FIG. 3, flight control 36 calculates the first derivative of the estimate of the true air speed, $d\hat{S}_{true}/dt$, of MAV 10 with respect to time at differentiation block 66.

At summing block 68 in the example algorithm of FIG. 3 flight control 36 sums the actual acceleration, ã, on MAV 10 sensed by, e.g., one or more accelerometers of sensors 40, the modeled acceleration, â, calculated at function block 62 based on the modeled forces, F, and moments, M, on the MAV, and the first derivative of the estimate of the true air speed, $d\hat{S}_{true}/dt$, of MAV 10 with respect to time from differentiation block 66. In particular at summing block 68, flight control 36 adds the first derivative of the estimate of the true air speed, $d\hat{S}_{true}/dt$, of MAV 10 to the difference between the actual acceleration, ã, on the MAV and the modeled acceleration, â, calculated at function block 62.

At integration block 70, flight control 36 integrates the result of summing block 68 to determine a new (e.g., initial or updated, depending on the cycle through the algorithm shown in FIG. 3) estimate of the true air speed, $\hat{S}_{true}$, of MAV 10. As such, flight control 36 integrates the difference between the actual acceleration, ã, on MAV 10 and the modeled acceleration, â, plus the first derivative of the estimate of the true air speed, $d\hat{S}_{true}/dt$, of the MAV according to the following formula to calculate an updated estimate of the true air speed, $\hat{S}_{true}$, of the MAV.

$$\hat{S}_{true,t_n} = \int_{t_{n-1}}^{t_n} \left( \frac{d\hat{S}_{true,t_{n-1}}}{dt} + \tilde{a} - \hat{a} \right) dt \quad (8)$$

In the foregoing calculation of the estimate of the true air speed of the MAV 10, the integration spans the time from $t_{n-1}$, which is the previous time step through the algorithm of FIG. 3, to $t_n$, which is the current time step through the algorithm. As such, the estimate of the true air speed of the MAV 10 is represented as $\hat{S}_{true, tn}$, which indicates that the result of the foregoing calculation is the estimate of the true air speed of the MAV at the current time step, $t_n$, through the algorithm. Additionally, the first derivative of the estimate of the true air speed of MAV 10 is represented as $d\hat{S}_{true, tn-1}/dt$, which indicates that this term is the first derivative with respect to time of the estimate of the true air speed of the MAV at the previous time step, $t_{n-1}$, through the algorithm of FIG. 3.

At summing block 72 in the example algorithm of FIG. 3 flight control 36 determines an updated estimate of the speed of the wind, $\hat{S}_{wind}$, by calculating the difference between the updated estimate of the true air speed, $\hat{S}_{true}$, of MAV 10 and the current measurement of the ground speed, $S_{ground}$, of the MAV derived from, e.g., inertial, GPS, altitude, and acceleration data received from sensors 40. Thus, employing the same time notation used for the foregoing calculation of the updated estimate of the true air speed, $\hat{S}_{true, tn}$, of MAV 10 at the current time step, $t_n$, through the algorithm of FIG. 3, flight control 36 determines an updated estimate of the speed of the wind, $\hat{S}_{wind, tn}$, at the current time step, $t_n$, at summing block 72 according to the following formula.

$$\hat{S}_{wind,tn} = \hat{S}_{true,tn} - S_{ground,tn} \quad (9)$$

After calculating the updated estimate of the speed of the wind, $\hat{S}_{wind, tn}$, at the current time step, $t_n$, at summing block 72, flight control 36 may proceed to the next time step, $t_{n+1}$, through the algorithm of FIG. 3 by inputting the estimate of the speed of the wind, $\hat{S}_{wind, tn}$, at the time step, $t_n$, into function blocks 60 and 64 and repeating the foregoing process through another cycle of the example algorithm.

The techniques employed by flight control 36 disclosed above with reference to FIGS. 2 and 3 to estimate the speed of the wind during operation of MAV 10 are described without reference to particular directions of the variables involved in and resulting from the calculations executed by the flight control system of the MAV. However, in order to model the state of MAV 10, flight control 36 may, in one example, employ a coordinate system oriented relative to the vehicle, in which the variables involved in and resulting from the calculations executed by the flight control system of the MAV have directions defined by the vehicle coordinate system. For example, the scalar modeled acceleration, â, described above may include the vector modeled accelerations, $\hat{a}_x$, $\hat{a}_y$, and $\hat{a}_z$, in x, y, and z directions of a vehicle coordinate system employed by flight control 36. Similarly, the scalar actual acceleration, ã, sensed by, e.g., accelerometers of sensors 40 may include the vector sensed accelerations, $\tilde{a}_x$, $\tilde{a}_y$, and $\tilde{a}_z$, in x, y, and z directions of a vehicle coordinate system employed by flight control 36.

Figure 4A:
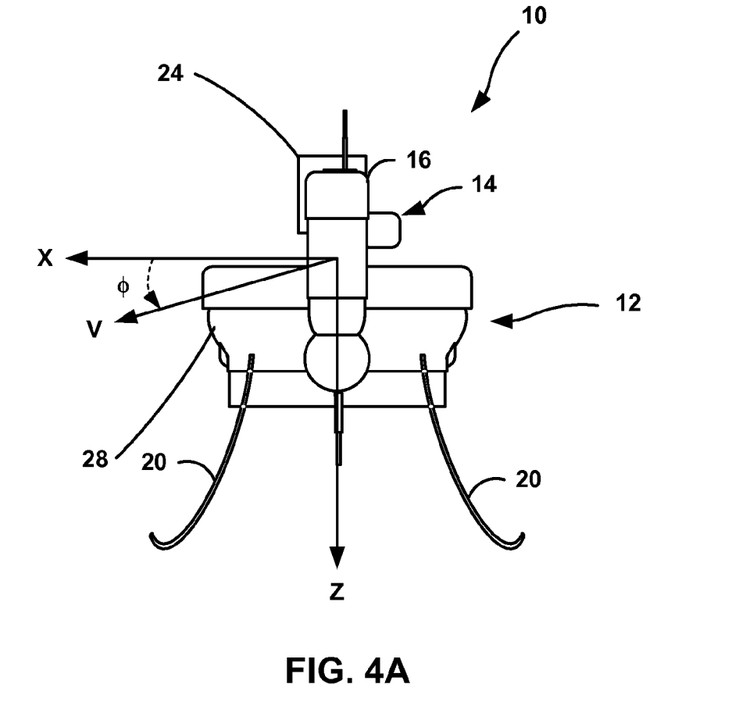
FIGS. 4A-4C are schematic illustrations of an example Cartesian coordinate system oriented relative to the MAV of FIG. 1.
Figure 4B:
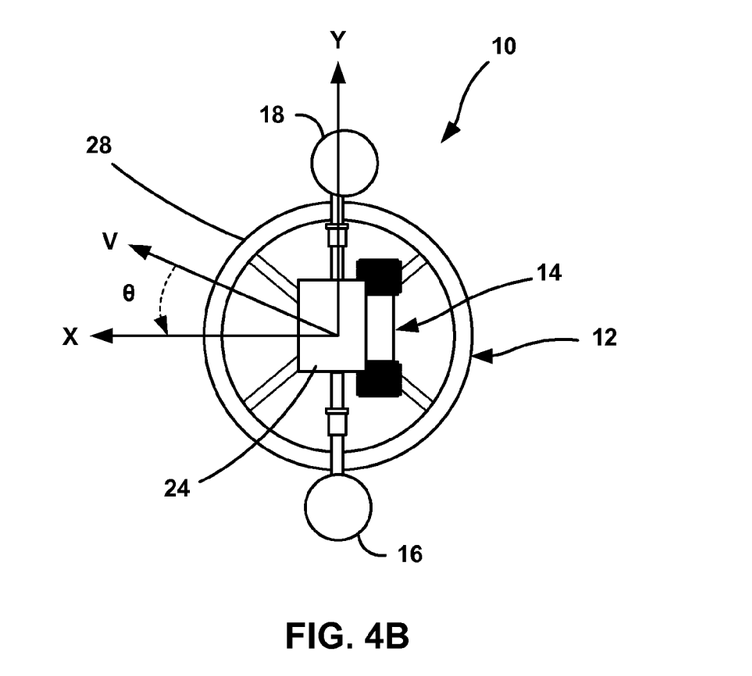
Figure 4C:
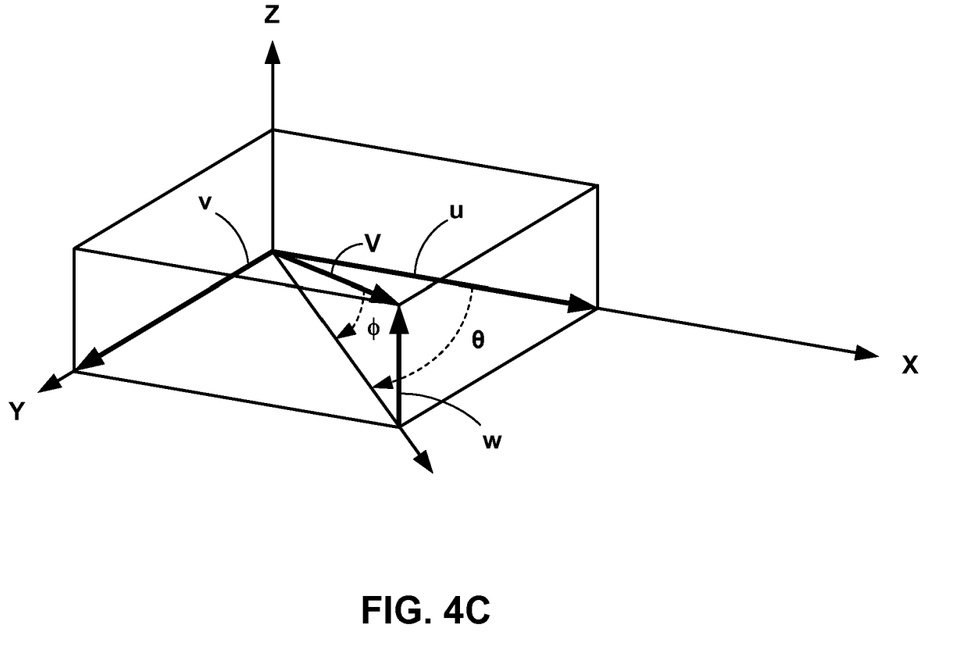

In one example, models executed by flight control 36 may employ the vehicle coordinate system represented in FIGS. 4A-4C with reference to MAV 10. In FIGS. 4A and 4B, the vehicle coordinate system is a Cartesian coordinate system including orthogonal x, y, and z directions along the X, Y, and Z axes, respectively. The Z axis of the vehicle coordinate system is aligned with the rotational axis of ducted fan 12 of MAV 10. The X and Y axes lie in a plane substantially perpendicular to the Z axis and intersect at an approximately 90 degree angle to one another at an origin located approximately at a center of ducted fan 12 of MAV 10. In FIG. 4A, the Y axis is directed into the paper, perpendicular to the view shown. In FIG. 4B, the Z axis is directed into the paper, perpendicular to the view shown.

In other examples, a vehicle coordinate system of MAV 10 may be defined differently than the example shown in FIGS. 4A-4C. In some examples, however, at least one axes of the vehicle coordinate system may, in general, be aligned with the rotational axis of ducted fan 12 of MAV 10.

FIG. 4C is a schematic illustration of the vehicle coordinate system of MAV 10 of FIGS. 4A and 4B shown without the MAV. In FIG. 4C, the velocity vector, V, of MAV 10 in flight is illustrated and is separated into its x, y, and z components u, v, and w, respectively, and the polar angles φ and θ of the vector, V, are represented. The angle θ is the angle between the X axis of the coordinate system of FIG. 4C oriented relative to MAV 10 and velocity vector, V. The angle φ is the angle between the X axis of the vehicle coordinate system of FIG. 4C and the velocity vector, V, projected into the X-Y plane of the coordinate system. The magnitude, S, and direction of the velocity vector, V, in the coordinate system of MAV 10 illustrated in FIGS. 4A-4C, as defined by polar angles φ and θ, may be determined according to the following formulas.

$$S = \sqrt{u^2 + v^2 + w^2} \qquad (10)$$

$$\theta = 0, \text{ where } S = 0, \text{ and} \qquad (11)$$

$$\theta = sin^{-1}\left(\frac{w}{S}\right) \cdot \frac{180}{\pi}, \text{ where } S > 0 \qquad (12)$$

$$\phi = 0, \text{ where } S = 0, \text{ and} \qquad (13)$$

$$\phi = tan^{-1}\left(\frac{v}{u}\right) \cdot \frac{180}{\pi}, \text{ where } S > 0 \qquad (14)$$

In some examples, flight control 36 may measure the ground speed and model the forces and moments in the example vehicle coordinate system of FIGS. 4A-4C, or another similar coordinate system oriented relative to MAV 10. However, all of the variables necessary to estimate the speed of the wind during operation of MAV 10 and/or estimate the true air speed of the MAV may not be oriented in this coordinate system. For example, the actual acceleration of MAV 10 sensed by, e.g., one or more accelerometers of sensors 40 may be located in avionics pod 16 of the MAV and may therefore be offset from the origin of vehicle coordinate system by a distance. Additionally, it may be advantageous to express the estimate of the speed of the wind during operation of MAV 10 in terms of, e.g., North, East, and down directions, which, depending on the attitude of the MAV in flight may or may not correspond to the directions x, y, and z, respectively, of the vehicle coordinate system of FIGS. 4A-4C.

In order to execute the calculations described above with reference to FIGS. 2 and 3, therefore, flight control 36 may need to transform some variables from one coordinate system to another. For example, flight control 36 may need to transform the actual acceleration, ã, from a coordinate system oriented relative to one or more accelerometers of sensors 40 arranged in avionics pod 16 of MAV 10 to the vehicle coordinate system of FIGS. 4A-4C. Alternatively, flight control 36 may also transform the modeled acceleration, â, determined based on the modeled forces and moments, from the vehicle coordinate system of FIGS. 4A-4C to the coordinate system oriented relative to the accelerometers of sensors 40 arranged in avionics pod 16 of MAV 10. Additionally, flight control 36 may, in one example, transform an estimate of the speed of the wind oriented in the vehicle coordinate system of FIGS. 4A-4C to a geographic coordinate system including, e.g., the directions North, East, and down.

In one example, flight control 36 of avionics 30 of MAV 10 may, in order to estimate the speed of the wind and/or true air speed of the MAV, transform the modeled acceleration, â, determined based on the modeled forces and moments, from the vehicle coordinate system of FIGS. 4A-4C to the coordinate system oriented relative to, e.g., one or more accelerometers of sensors 40 arranged in avionics pod 16 of MAV 10. In such an example, modeled accelerations, $\hat{a}_x$, $\hat{a}_y$, and $\hat{a}_z$, in the x, y, and z directions, respectively, of the vehicle coordinate system of FIGS. 4A-4C may be transformed to a sensor coordinate system offset from the origin of the vehicle coordinate system by distances, $l_x$, $l_y$, and $l_z$, in the x, y, and z directions, respectively, of the sensor coordinate system.

Referring again to FIG. 3, several implementation details may be added to the example algorithm executed by flight control 36 to estimate the speed of the wind during operation of MAV 10. In one example, the algorithmic equivalent of a switch may be added at one or more points in the algorithm of FIG. 3 by which flight control 36 can turn the wind estimation determination on or off. An example algorithmic switch may be a function that is called by flight control 36 at one or more points in each iteration of the algorithm of FIG. 3 and sets a value to, e.g., either 1 or 0 to "switch on" or "switch off," respectively, the algorithm or a particular operation within the algorithm.

In another example, the estimate of the wind, $\hat{S}_{wind}$, which results from summing block 72, may be limited to a certain threshold value using a clipping function. In such an example, the estimate of the speed of the wind, $\hat{S}_{wind}$, resulting from summing block 72 may be compared to a maximum threshold value and, if the estimate exceeds the threshold, the estimate of the speed of the wind may be changed to, e.g., the threshold value, or some other value for use by flight control 36 in the next iteration of the algorithm. Limiting, or "clipping" the estimate of the speed of the wind determined by flight control 36 may be implemented to guard against sensor or execution errors that yield large values of and/or large changes in the speed of the wind. In some examples, the clipping function added to the algorithm of FIG. 3 may not only limit the estimated wind speed to a maximum value, but may also include a minimum speed threshold and a maximum rate of change of the estimated wind speed from one cycle of the algorithm to the next.

In some examples including a clipping function applied to the estimated wind speed, it may be necessary to prevent integral windup at integration block 70. Integral windup may, in some examples, cause integration block 70 to continue to yield larger and larger values of the estimate of the true air speed, $\hat{S}_{true}$, in spite of the estimated wind speed, $\hat{S}_{wind}$, having reached the maximum threshold imposed by the clipping function. In the event integral windup is a concern, an anti-windup feedback loop may be added to the algorithm of FIG. 3 after the added clipping function that limits the estimated wind speed to a maximum threshold value.

In addition to the foregoing example modifications to the example algorithm of FIG. 3, in one example, flight control 36 may also apply one or more gains to one or more variables included in the wind estimation algorithm. Modeling the actual state of MAV 10 in flight may include a great deal of complexity, which may, in some examples, require advanced system control techniques. In a closed loop control system, such as the example algorithm of FIG. 3, it may be, in some cases, appropriate to apply techniques to the system that inhibit or eliminate untoward execution, calculation, or other algorithmic errors. The application of the clipping function and the anti-windup feedback loop described above are examples of such control system techniques. Another example control system technique is the application of a gain value to control the rate, e.g., algorithm cycles per second, at which the solution converges and to inhibit or prevent closed loop system instability. In the example of the algorithm of FIG. 3, for instance, a gain may be applied to one or more calculations involved in the wind speed estimation to control how quickly the algorithm converges from a starting point of, e.g., zero wind speed to an acceptably accurate estimate of the speed of the wind during operation of MAV 10. For example, the difference between the actual acceleration, ã, on MAV 10 in flight sensed by, e.g., one or more accelerometers and the modeled acceleration, â, may require application of a gain in the algorithm of FIG. 3 such that the summing block 66 changes from:

$$\frac{d\hat{S}_{true}}{dt} + \tilde{a} - \hat{a}, \text{ to} \quad (15)$$

$$\frac{d\hat{S}_{true}}{dt} + k \cdot (\tilde{a} - \hat{a}), \quad (16)$$

where k is the gain.

In one example, the gain, k, applied to the difference between the actual acceleration, ã, on MAV 10 in flight and the modeled acceleration, â, may be a constant that is determined based on data from simulations and/or tests of the state of MAV 10 in flight. For example, the gain, k, may be determined by performing a linear and/or nonlinear analysis of the state of MAV 10 in flight. In one example, one or more linear simulations of MAV 10 in flight may be executed to test a broad spectrum of flying conditions via models of relatively reduced complexity, i.e., linear versus non-linear models. The linear simulations may produce a number of possible values for the gain, k, for use in an algorithm, e.g. the algorithm of FIG. 3, executed by flight control 36 to estimate the speed of the wind during operation of MAV 10. The possible values for the gain, k, produced by the linear simulation(s) may then be tested via one or more non-linear simulations of MAV 10 in flight. Finally, the possible values for the gain, k, produced by the linear simulations and successfully tested in the non-linear simulations may be tested by experiment, e.g. by wind-tunnel testing. Based on, e.g., the wind-tunnel testing, one value for the gain, k, may be selected for use in an algorithm, e.g. the algorithm of FIG. 3, executed by flight control 36 to estimate the speed of the wind during operation of MAV 10.

In one example, the gain, k, employed by flight control 36 in the example algorithm of FIG. 3, or another similar wind estimation algorithm in accordance with this disclosure, may be determined by assuming a desirable solution convergence rate and employing a linear model to determine the gain that corresponds to the assumed convergence rate. Assuming the gain, k, is applied to the difference between the actual acceleration, ã, on MAV 10 in flight and the modeled acceleration, â, in the example algorithm of FIG. 3, as described above, the control theory principle of separation of estimation and control may be employed to break the control system represented by the example algorithm into two components corresponding to an optimal observer of the state of the system and an optimal controller for the system. Assuming application of the separation principle to the example algorithm of FIG. 3 with the addition of the gain, k, multiplied by the difference between the actual acceleration, ã, and the modeled acceleration, â, an estimated value, Â, for a feedback loop between the algorithm solution, i.e. wind estimate, and the gain may be defined according to the following formula.

$$\hat{A} = D_{\dot{S},wind} - (k \cdot D_{a,wind}) \quad (17)$$

In the foregoing formula, k is the gain, $D_{\dot{S},\ wind}$ is the sensitivity of the first derivative of the speed of MAV 10 to a unit change of the speed of the wind and $D_{a,\ wind}$ is the sensitivity of the acceleration of the MAV to a unit change of the speed of the wind. The sensitivity, $D_{\dot{S},\ wind}$, of the first derivative of the speed of MAV 10 to a unit change of the speed of the wind and the sensitivity, $D_{a,\ wind}$, of the acceleration of the MAV to a unit change of the speed of the wind are constant values dictated by the physical configuration of the MAV. In one example, the sensitivity, $D_{\dot{S},\ wind}$, of the first derivative of the speed of MAV 10 to a unit change of the speed of the wind and the sensitivity, $D_{a,\ wind}$, of the acceleration of the MAV to a unit change of the speed of the wind may be determined by wind-tunnel testing of the MAV.

As noted above, flight control 36 may, in practice, execute the example algorithm of FIG. 3 not in terms of scalar, directionless variables, but, instead, in terms of vectors having directions in one or more coordinate systems. In such examples, it may be necessary to apply a transform matrix, T, to one or more values from which the estimated value, Â, for the feedback loop is calculated in the foregoing formula. For example, as noted above, the example algorithm of FIG. 3 may yield the estimated wind speed in terms of the x, y, and z directions of the vehicle coordinate system of FIGS. 4A-4C. However, it may be advantageous to express the estimate of the speed of the wind during operation of MAV 10 in terms of, e.g., North, East, and down directions, which, depending on the attitude of the MAV in flight may or may not correspond to the directions x, y, and z, respectively, of the vehicle coordinate system of FIGS. 4A-4C. In such cases, the estimated wind speed may be multiplied by a transform matrix, $T_g^v$, that transforms the wind estimate from the vehicle coordinate system, e.g. the example of FIGS. 4A-4C, to a geographical coordinate system including North, East, and down directions. Applying the coordinate system transform to a feedback loop with vector variables, instead of scalar, directionless variables, yields the following formula for the estimated value, Â, for a feedback loop between the algorithm solution, i.e. wind estimate, and the gain.

$$\hat{A} = [D_{\dot{u}\dot{v}\dot{w},wind} - (K \cdot D_{a_{xyz},wind})]T_g^v \quad (18)$$

As noted above, in one example, the gain, k, employed by flight control 36 in the example algorithm of FIG. 3, or another similar wind estimation algorithm in accordance with this disclosure, may be determined by assuming a desirable solution convergence rate. In the foregoing formula, the convergence rate of the feedback loop between the algorithm solution, i.e., wind estimate, and the gain can be controlled by setting the eigenvalue of the estimated value, Â, for the feedback loop. In one example, the estimated value, Â, for the feedback loop is assumed to be a three-by-three diagonal matrix with constant values selected for the diagonal based on a desirable solution convergence rate. In such an example, the eigenvalue of the estimated value, Â, for the feedback loop is the constant values of the diagonal of the matrix Â. Therefore, setting the eigenvalue, λ, to, e.g., [B C D] the estimated value, Â, for the feedback loop is a three-by-three diagonal matrix in accordance with the following formulas.

$$\lambda = [B \ C \ D], \text{ and} \quad (19)$$

$$\hat{A} = \text{diag}(\lambda) = \begin{bmatrix} B & 0 & 0 \\ 0 & C & 0 \\ 0 & 0 & D \end{bmatrix} \quad (20)$$

In this example in which the eigenvalue, λ, of the estimated value, Â, for the feedback loop is set, the gain, k, may be solved for by flight control 36 according to the following formulas.

$$\hat{A} = [D_{\dot{u}\dot{v}\dot{w},wind} - (k \cdot D_{a_{xyz},wind})]T_g^v \quad (21)$$

$$\hat{A} \cdot T_v^g = D_{\dot{u}\dot{v}\dot{w},wind} - (k \cdot D_{a_{xyz},wind}) \quad (22)$$

-continued $$k \cdot D_{a_{xyz},wind} = D_{\dot{u}\dot{v}\dot{w},wind} - \hat{A} \cdot T_v^g \quad (23)$$

$$k = \frac{D_{\dot{u}\dot{v}\dot{w},wind} - \hat{A} \cdot T_v^g}{D_{a_{xyz},wind}}, \text{ or} \quad (24)$$

$$k = (D_{\dot{u}\dot{v}\dot{w},wind} - \hat{A} \cdot T_v^g)D_{a_{xyz},wind}^{-1} \quad (25)$$

Employing the foregoing linear simulation technique a number of values for the gain, k, can be determined by selecting a number of eigenvalues, λ, or, in other words, assuming a number of values for, e.g., B, C, and D and solving the foregoing feedback loop equation for the gain. After determining a set of values for the gain, k, each of the values may be tested, as noted above, by running one or more non-linear simulations of MAV 10 in flight.

In one example, the non-linear simulations employed to test the values for the gain, k, may include a Monte-Carlo simulation. Monte Carlo methods are a class of computational algorithms that rely on repeated random number sampling to compute their results, and are commonly used in simulating physical and mathematical systems. Because of their reliance on repeated computation of random or pseudo-random numbers, these methods may be most suited to calculation by a computer and may be used when it is unfeasible or impossible to compute an exact result with a deterministic algorithm. Although Monte Carlo methods come in a variety of form these techniques generally follow a particular pattern including: defining a domain of possible inputs, generating inputs randomly from the domain using a certain specified probability distribution, performing a deterministic computation using the inputs, and aggregate the results of the individual computations into a final result.

In the context of testing the gain, k, employed by flight control 36 to execute the wind estimation algorithm of FIG. 3, a non-linear Monte-Carlo simulation may allow testing of a number of randomly selected values for variables relevant to MAV 10 in flight, like the speed and direction of the wind, and to treat a relatively limited number of such samples and calculations based thereon like a full statistical sampling of a large number of values of the variables.

Tests of a MAV similar to MAV 10 described above were performed in accordance with the foregoing process to test different gain values and determine an optimal gain value for use in a wind estimation algorithm in accordance with this disclosure. Estimated wind speed maximum and minimum thresholds and maximum estimated wind speed rate of change threshold from one algorithm cycle to the next were also tested for use in a clipping function as described above. The following conclusions were drawn from the testing.

The eigenvalue, λ, of the estimated value, Â, for the feedback loop was set to a number of different values including [−4 −4 −0.4], [−2 −2 −0.2], and [−8 −8 −0.8] corresponding to the constants [B C D] described in the calculations described above. The three constants of the eigenvalues correspond, in part, to the three directions the estimated wind speed of the MAV, including, e.g., the North, East, and down directions of a geographical coordinate system used to express the estimated wind speed as a vector in space. The relative difference in the magnitude of the B and C constants of the selected eigenvalues and the D value, represents the assumption that the speed of the wind in the down direction is zero or near zero and, therefore, the constant of the eigenvalue corresponding to this direction is of reduced importance in the calculations of the gain.

The selection of [−4 −4 −0.4] for B and C in the eigenvalues was based on a desired solution convergence rate for the wind estimation algorithm in which the gain, k, which was calculated based, in part, on the selected eigenvalues, was employed. The selection of the eigenvalues [−2 −2 −0.2] and [−8 −8 −0.8] was based on the starting point of [−4 −4 −0.4] and represented a decrease and an increase, respectively of this starting point by a factor of 2. After testing the gain calculated based on the foregoing eigenvalues in non-linear simulations of the MAV in flight and then in actual flight tests of the MAV, the eigenvalue of [−4 −4 −0.4] was determined to yield the best value of the gain. However, based on the results from all of the testing, it is believed that eigenvalues with constants corresponding to B and C in a range from approximately −1.5 to approximately −15 and a constant corresponding to D in a range from approximately −0.15 to approximately −1.5 may be useful.

In addition to the foregoing eigenvalue, λ, of the estimated value, Â, for the feedback loop described above for determining possible values of the gain, k, for use in a wind estimation algorithm in accordance with this disclosure, the tests of the MAV also included testing different maximum and minimum thresholds for the estimated wind speed and maximum thresholds for the rate of change of the estimated wind speed from one algorithm cycle to the next. The maximum thresholds for the rate of change of the estimated wind speed that were tested included 2, 4, and 8 feet per second squared (0.6, 1.2, and 2.4 meters per second squared, respectively). The maximum and minimum thresholds for the estimated wind speed were set in the North and East directions to +33.8 feet per second (10.3 meters per second) and −33.8 feet per second, respectively, based on the vehicle speed limit and to 1 foot per second in the down direction. Based on the testing of the MAV employing a wind estimation algorithm including a clipping function that used the maximum thresholds for the rate of change of the estimated wind speed of 2, 4, and 8 feet per second squared (0.6, 1.2, and 2.4 meters per second squared), the rate of change of the estimated wind speed maximum threshold that was determined to function best in the algorithm was 4 feet per second squared (1.2 meters per second squared).

Figure 5:
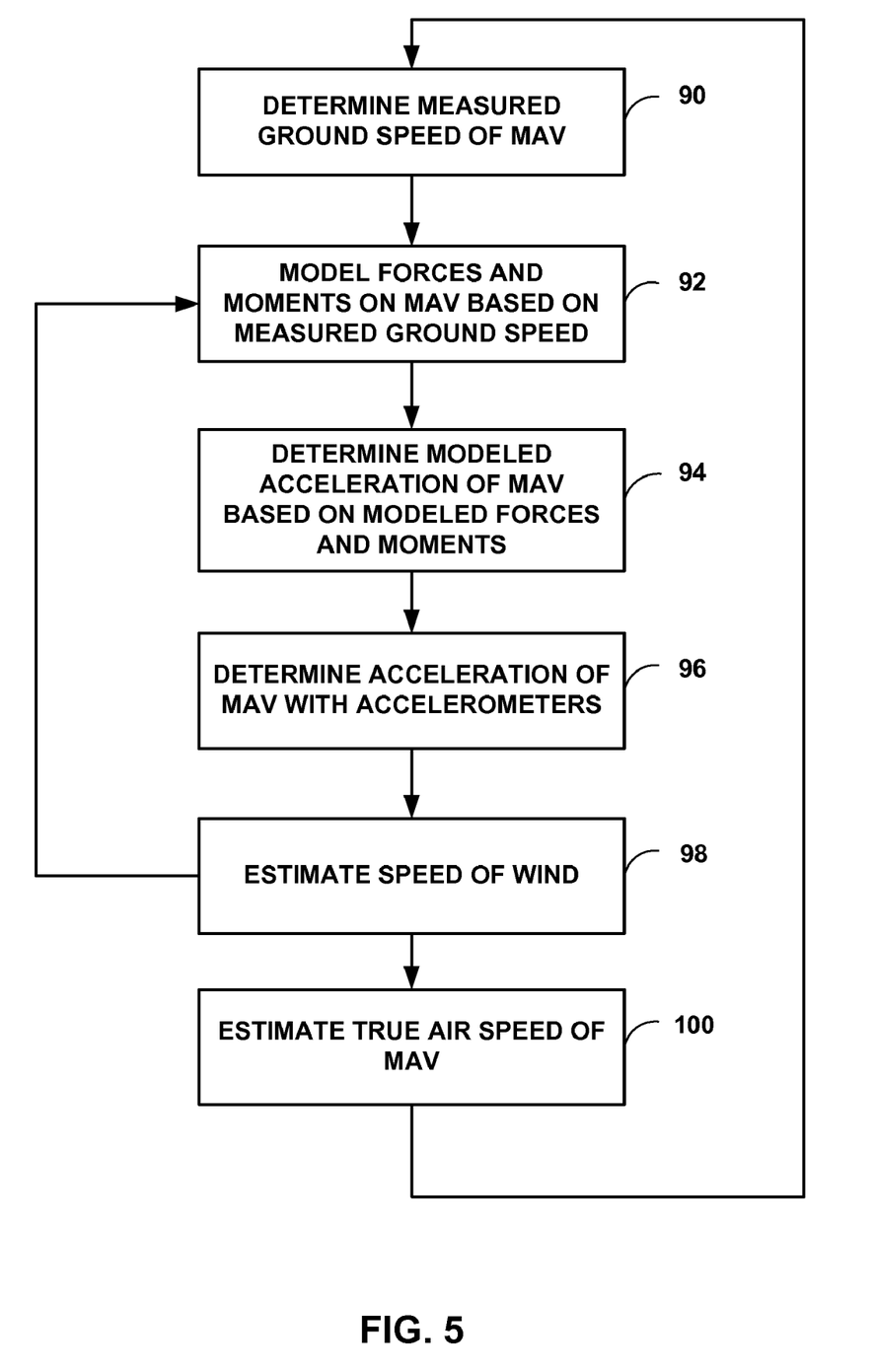
FIG. 5 is a flow chart illustrating an example method of estimating the speed of the wind during operation of a MAV.

FIG. 5 is a flow chart illustrating an example method of estimating the speed of the wind during operation of a MAV. The example method of FIG. 5 includes determining a measured ground speed of a MAV in flight (90), modeling forces and moments on the MAV based on the measured ground speed (92), determining a modeled acceleration of the MAV based on the modeled forces and moments (94), determining an actual acceleration of the MAV with one or more accelerometers (96), estimating the speed of the wind during operation of the MAV (98), and estimating the true air speed of the MAV in flight (100).

The functions of the method of FIG. 5 for estimating the speed of the wind during operation of a MAV are described as executed by example avionics 30, and, in particular, flight control 36 of example MAV 10. However, in other examples, the functions associated with the method of FIG. 5 may be executed by other avionics configured differently and employed on different MAVs or other UAVs. For example, an alternative avionics system employed in a MAV may include a navigation solution including a Kalman filter that processes raw sensor data into vehicle state information including, e.g., speed, position, attitude, rotational speeds, and the like of the MAV.

The example method of FIG. 5 includes flight control 36 determining a measured ground speed of a MAV in flight (90). In one example, flight control 36 of avionics 30 may employ inertial, GPS, vehicle altitude, and acceleration data from sensors 40 to determine the ground speed of MAV 10. For example, flight control 36 may process raw data received from sensors 40 in a navigation solution included in avionics 30 of MAV 10. The navigation solution may include a Kalman filter that augments data from, e.g., one or more accelerometers of sensors 40 with, e.g., gyroscope inertial, GPS, and barometer altitude data to measure the ground speed of MAV 10 in flight, as well as, in some examples, the position, attitude, and rotational rates of the vehicle.

Flight control 36 also models the forces and moments on the MAV based on the measured ground speed (92). In one example, flight control 36 may be configured to model the forces and moments on MAV 10 as a function of a number of different measured or derived parameters in addition to the measured ground speed, including, e.g., the rotational speed of the fan of ducted fan 12 in, e.g., RPM, the orientation of the vehicle, and the position of the control vanes of the ducted fan. The rotational speed of the fan of ducted fan 12 and the deflections of the control vanes of ducted fan 12 may, as noted above, be known values based on the current operating state of MAV 10 and the orientation of the vehicle, e.g. the polar angles $\phi$ and $\theta$ described above, may be determined using data from sensors 40, including, e.g. inertial sensors like gyroscopes, which may be indicative of the attitude of MAV 10 in the air during flight.

In some examples, flight control 36 may analytically model the forces, F, and moments, M, on MAV 10. In other examples, however, flight control 36 employs look-up tables to determine the forces and moments on the vehicle. For example, flight control 36 or another part of avionics 30 of MAV 10 may access a memory on which look-up tables organizing and cross-referencing different data related to the vehicle may be stored in order to estimate the forces and moments exerted on MAV 10 based on one or more vehicle parameters. In particular, an array of force and moment values may be stored in one or more look-up tables stored on memory of flight control 36, which are correlated to particular flight conditions. For example, for a given rotational speed of the fan of ducted fan 12, deflections of the control vanes of the ducted fan, attitude of MAV 10, e.g., expressed as polar angles $\phi$ and $\theta$, and ground speed of the MAV, reference to the look-up tables by flight control 36 may return particular values for the forces and moments on the MAV. The data that populates the look-up tables employed by flight control 36 may be generated from one or more simulations and/or actual tests of MAV 10 in a variety of different flight conditions.

After modeling forces and moments on the MAV based on the measured ground speed (92), flight control 36 may determine a modeled acceleration of the MAV based on the modeled forces and moments (94). As the mass of MAV 10 may generally be a known value, a model of the accelerations on the MAV may be determined by flight control 36 from the modeled forces and moments. For example, a modeled acceleration may be calculated by flight control 36 as equal to a modeled force divided by the mass of the MAV. In another example, a modeled acceleration may be calculated by flight control 36 as equal to a modeled moment divided by the mass of MAV 10 multiplied by a moment arm about which the moment is applied to the vehicle.

The example method of FIG. 5 also includes determining an actual acceleration of the MAV with one or more accelerometers (96). Sensors 40 onboard MAV 10 may include one or more accelerometers, such as any combination of one-axis, two-axis or three-axis accelerometers, capable of detecting static orientation or vectors in three-dimensions. In one example, sensors 40 of MAV 10 include one or more multi-axis micro-electro-mechanical accelerometers that are configured to generate signals indicative of the actual acceleration on the MAV in multiple directions, e.g., x, y, and z directions of a vehicle coordinate system.

After determining a modeled acceleration of MAV 10 based on the modeled forces and moments (94) and measuring an acceleration of the MAV with one or more accelerometers (96), flight control 36 may estimate the speed of the wind during operation of the MAV (98). In particular, flight control 36 may estimate the speed of the wind during operation of MAV 10 (98) as the integral of the difference between the modeled acceleration and the actual acceleration of the MAV.

In order to execute the functions associated with the method of FIG. 5, flight control 36 may need to transform some variables from one coordinate system to another. For example, in order to estimate the speed of the wind during operation of MAV 10 (98), flight control 36 may need to transform the actual acceleration from a coordinate system oriented relative to the accelerometers of sensors 40 arranged in avionics pod 16 of MAV 10 to a vehicle coordinate system, e.g. the example vehicle coordinate system of FIGS. 4A-4C. Alternatively, flight control 36 may, e.g., transform the modeled acceleration determined based on the modeled forces and moments, from the vehicle coordinate system of FIGS. 4A-4C to the coordinate system oriented relative to the accelerometers of sensors 40 arranged in avionics pod 16 of MAV 10. Additionally, flight control 36 may, in one example, transform the estimated wind speed oriented in a vehicle coordinate system, e.g. the example coordinate system of FIGS. 4A-4C to a geographic coordinate system including, e.g., the directions North, East, and down.

In one example of the method of FIG. 5, the estimate of the speed of the wind determined by flight control 36 may be limited to a certain threshold value using a clipping function. In such an example, flight control 36 may compare the estimate of the speed of the wind to a maximum threshold value and, if the estimate exceeds the threshold, the estimate of the speed of the wind may be changed to, e.g., the threshold value, or some other value for use by flight control 36, e.g. in the next iteration of the method of FIG. 5. Limiting, or "clipping" the estimate of the speed of the wind determined by flight control 36 may be implemented to guard against sensor or execution errors that yield large values of and/or large changes in the speed of the wind. In some examples, the clipping function may not only limit the estimated wind speed to a maximum value, but may also include a minimum speed threshold and a maximum rate of change of the estimated wind speed from one cycle of the algorithm to the next.

In some examples including a clipping function applied to the estimated wind speed, it may be necessary to prevent integral windup in the calculation by flight control 36 of the integral of the difference between the modeled acceleration and the actual acceleration of MAV 10. As such, in one example of the method of FIG. 5, flight control 36 may employ an anti-windup feedback loop to inhibit the or prevent the integration of the difference between the modeled acceleration and the actual acceleration of MAV 10 executed by flight control 36 from yielding larger and larger values of the estimated wind speed in spite of the estimate having reached, e.g., a maximum threshold imposed by a clipping function.

In addition to the foregoing example additions to the example method of FIG. 5, in one example, flight control 36 may also apply one or more gains to one or more variables included in the wind estimation method. A gain may be applied to one or more calculations involved in the wind speed estimation method of FIG. 5 to control how quickly the solution converges from a starting point of, e.g., zero wind speed to an acceptably accurate estimate of the speed of the wind during operation of MAV 10. For example, the difference between the actual (e.g., sensed by one or more accelerometers) acceleration on MAV 10 in flight and the modeled acceleration may multiplied by a gain by flight control 36 before being integrated to determine the estimated wind speed.

The gain, k, applied to, e.g., the difference between the actual acceleration on MAV 10 in flight and the modeled acceleration may be a constant that is determined based on data from simulations and/or tests of the state of MAV 10 in flight. For example, the gain, k, may be determined by executing one or more linear and/or non-linear simulations of the state of MAV 10 in flight. In one example, one or more linear simulations of MAV 10 in flight may be executed to test a broad spectrum of flying conditions via models of relatively reduced complexity, i.e. linear versus non-linear models. The linear simulations may produce a number of possible values for the gain, k, for use in the example method of FIG. 5 executed by flight control 36 to estimate the speed of the wind during operation of MAV 10. The possible values for the gain, k, produced by the linear simulation(s) may then be tested via one or more non-linear simulations of MAV 10 in flight, including, e.g., one or more Monte-Carlo non-linear simulations. Finally, the possible values for the gain, k, produced by the linear simulations and successfully tested in the non-linear simulations may be tested by experiment, e.g. by wind-tunnel testing. The wind-tunnel testing may establish, for example, which gain resulted in the wind estimate that is closest to the actual wind within the wind tunnel environment. Based on, e.g., the wind-tunnel testing, one value for the gain, k, may be selected for use in the example method of FIG. 5 executed by flight control 36 to estimate the speed of the wind during operation of MAV 10.

After estimating the speed of the wind during operation of MAV 10 (98), flight control 36 may estimate the true air speed of the MAV in flight (100). For example, flight control 36 may estimate the true air speed of MAV 10 by adding the estimated wind speed to the measured ground speed of the vehicle. The estimated true air speed of MAV 10 may be used by flight control 36 to, e.g., control the trajectory of the MAV in flight.

As is illustrated by the return arrows from estimating the speed of the wind during operation of MAV 10 (98) and estimating the true air speed of the MAV in flight (100) in FIG. 5, the example method may be repeated iteratively to periodically or continuously estimate the speed of the wind during operation of the MAV. The frequency at which the method of FIG. 5 cycles through successive iterations to estimate the speed of the wind during operation of the MAV may vary in different applications and implementations of the wind estimation method. The wind estimation method of FIG. 5 may, for example, cycle through successive iterations at a frequency in a range from approximately 50 Hertz (Hz) to approximately 100 Hz. However, other frequencies are contemplated.

In one example, the estimated wind speed determined by flight control 36 (98) in a first iteration of the example method of FIG. 5 is input into the model of forces and moments on MAV 10 (92) in a second iteration of the method. The previous estimate of the speed of the wind determined by flight control 36 in the first iteration may then be used to model the forces and moments on MAV 10 in a second iteration of the method based not just on the measured ground speed, but also on an estimate of the true air speed of the MAV. The measured ground speed used in the second iteration is an updated measurement made by flight control 36 at the beginning of the second iteration of the method of FIG. 5. The updated measured ground speed made by flight control 36 at the beginning of the second iteration may, in one example, then be added to the estimated wind speed determined in the first iteration to determine an estimate of the true air speed of MAV 10 for use in the force and moment model executed by flight control 36 in the second iteration of the method of FIG. 5.

In another example of techniques for estimating the speed of the wind during operation of an MAV, a system includes means for modeling an acceleration of a UAV based at least on a measured ground speed of the UAV, means for determining an actual acceleration of the UAV with one or more sensors, and means for estimating a speed of the wind as an integral of a difference between the modeled acceleration and the actual acceleration. In one example, the means for modeling an acceleration of the UAV includes means for modeling at least one of one or more forces or one or more moments on the UAV based at least on the measured ground speed of the UAV and means for determining the modeled acceleration based at least on the modeled at least one of one or more forces or one or more moments on the UAV and a mass of the UAV.

In one example, the means for determining an actual acceleration of the UAV includes one or more accelerometers mechanically connected to the UAV. At least one of the one or more accelerometers may, in one example, include a multi-axis micro-electro-mechanical accelerometer.

In one example, the system may also include means for estimating a true air speed of the UAV as a sum of the estimated wind speed and the measured ground speed of the UAV. In another example, the system may also include means for controlling a trajectory of the UAV in flight based at least on the estimated true air speed of the UAV.

In one example, the system may also include means for transforming at least one of the modeled acceleration, the actual acceleration, or the estimated wind speed from a first coordinate system to a second coordinate system. The means for transforming may, in one example, include means for transforming at least one of the modeled acceleration or the actual acceleration from a first Cartesian coordinate system to a second Cartesian coordinate system, in which one of the first or the second Cartesian coordinate systems comprises a coordinate system oriented relative to the UAV. In one example, the means for transforming at least one of the modeled acceleration or the actual acceleration from a first Cartesian coordinate system to a second Cartesian coordinate system includes means for transforming the modeled acceleration from a first Cartesian coordinate system oriented relative to the UAV to a second Cartesian coordinate system oriented relative to at least one of the one or more sensors. In another example, the means for transforming at least one of the modeled acceleration or the actual acceleration from a first Cartesian coordinate system to a second Cartesian coordinate system includes means for transforming the actual acceleration from a first Cartesian coordinate system oriented relative to at least one of the one or more sensors to a second Cartesian coordinate system oriented relative to the UAV. In another example, the means for transforming at least one of the modeled acceleration, the actual acceleration, or the estimated wind speed from a first coordinate system to a second coordinate system includes means for transforming the estimated wind speed from a Cartesian coordinate system to a geographical coordinate system.

In one example, the system may also include means for determining the measured ground speed based on at least one of inertial measurement, Global Positioning System (GPS), altitude, or acceleration data related to the UAV.

In another example, the system may also include means for multiplying the difference between the modeled acceleration and the actual acceleration by a constant gain. The system may also include means for determining the gain based on at least one of one or more simulations or one or more tests of the UAV in flight. In one example, the means for determining the gain includes means for running one or more linear simulations of the UAV in flight to determine a first set of values for the gain, means for running one or more non-linear simulations of the UAV in flight to test each of the values in the first set of values for the gain, and means for running one or more test flights of the UAV to employing one or more of the values in the first set of values for the gain to determine one value for the gain.

Functions executed by avionics or other electronics associated with MAV 10 may be implemented, at least in part, by hardware, software, firmware or any combination thereof For example, various aspects of the techniques may be implemented within one or more processors, including one or more microprocessors, DSPs, ASICs, FPGAs, or any other equivalent integrated or discrete logic circuitry, as well as any combinations of such components, embodied in an avionics system of MAV 10. The term "processor" or "processing circuitry" may generally refer to any of the foregoing logic circuitry, alone or in combination with other logic circuitry, or any other equivalent circuitry.

Such hardware, software, firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

When implemented in software, functionality ascribed to MAV 10 avionics and other systems, devices and techniques may be embodied as instructions on a computer-readable medium such as random access memory (RAM), read-only memory (ROM), non-volatile random access memory (NVRAM), electrically erasable programmable read-only memory (EEPROM), FLASH memory, magnetic data storage media, optical data storage media, or the like. The instructions may be executed to support one or more aspects of the functionality described in this disclosure. The computer-readable medium may be nontransitory.

Any of the described units, modules or components may be implemented together or separately as discrete but interoperable logic devices. Depiction of different features as modules or units is intended to highlight different functions and does not necessarily imply that such modules or units must be realized by separate hardware or software components. Rather, functionality associated with one or more modules or units may be performed by separate hardware or software components, or integrated within common or separate hardware or software components.

Various examples have been described. These and other examples are within the scope of the following claims.

The invention claimed is:

1. A method comprising:
    modeling an acceleration of an unmanned aerial vehicle (UAV) based at least on a measured ground speed of the UAV;
    determining an actual acceleration of the UAV with one or more sensors; and
    estimating a speed of the wind as an integral of a difference between the modeled acceleration and the actual acceleration.

2. The method of claim 1, wherein modeling an acceleration of the UAV comprises:
    modeling at least one of one or more forces or one or more moments on the UAV based at least on the measured ground speed of the UAV; and
    determining the modeled acceleration based at least on the modeled at least one of one or more forces or one or more moments on the UAV and a mass of the UAV.

3. The method of claim 1, wherein determining an actual acceleration of the UAV comprises determining an actual acceleration of the UAV with one or more accelerometers mechanically connected to the UAV.

4. The method of claim 3, wherein at least one of the one or more accelerometers comprises a multi-axis micro-electro-mechanical accelerometer.

5. The method of claim 1, further comprising estimating a true air speed of the UAV as a sum of the estimated wind speed and the measured ground speed of the UAV.

6. The method of claim 5, further comprising controlling a trajectory of the UAV in flight based at least on the estimated true air speed of the UAV.

7. The method of claim 1, further comprising transforming at least one of the modeled acceleration, the actual acceleration, or the estimated wind speed from a first coordinate system to a second coordinate system.

8. The method of claim 7, wherein transforming at least one of the modeled acceleration, the actual acceleration, or the estimated wind speed from a first coordinate system to a second coordinate system comprises transforming at least one of the modeled acceleration or the actual acceleration from a first Cartesian coordinate system to a second Cartesian coordinate system, wherein one of the first or the second Cartesian coordinate systems comprises a coordinate system oriented relative to the UAV.

9. The method of claim 8, wherein transforming at least one of the modeled acceleration or the actual acceleration from a first Cartesian coordinate system to a second Cartesian coordinate system comprises transforming the modeled acceleration from a first Cartesian coordinate system oriented relative to the UAV to a second Cartesian coordinate system oriented relative to at least one of the one or more sensors.

10. The method of claim 8, wherein transforming at least one of the modeled acceleration or the actual acceleration from a first Cartesian coordinate system to a second Cartesian coordinate system comprises transforming the actual acceleration from a first Cartesian coordinate system oriented relative to at least one of the one or more sensors to a second Cartesian coordinate system oriented relative to the UAV.

11. The method of claim 7, wherein transforming at least one of the modeled acceleration, the actual acceleration, or the estimated wind speed from a first coordinate system to a second coordinate system comprises transforming the estimated wind speed from a Cartesian coordinate system to a geographical coordinate system.

12. The method of claim 1, further comprising determining the measured ground speed based on at least one of inertial measurement, Global Positioning System (GPS), altitude, or acceleration data related to the UAV.

13. The method of claim 1, further comprising multiplying the difference between the modeled acceleration and the actual acceleration by a constant gain.

14. The method of claim 13, further comprising determining the gain based on at least one of one or more simulations or one or more tests of the UAV in flight.

15. The method of claim 14, wherein determining the gain comprises:
running one or more linear simulations of the UAV in flight to determine a first set of values for the gain;
running one or more non-linear simulations of the UAV in flight to test each of the values in the first set of values for the gain; and
running one or more test flights of the UAV employing one or more of the values in the first set of values for the gain to determine one value for the gain.

16. An unmanned aerial vehicle (UAV) comprising:
a plurality of sensors mechanically connected to the UAV; and
a processor configured to model an acceleration on the UAV based at least on a ground speed of the UAV measured based on data from at least one of the sensors, determine an actual acceleration of the UAV with at least one of the sensors, and estimate the speed of the wind as an integral of a difference between the modeled acceleration and the actual acceleration.

17. The UAV of claim 16, further comprising the processor configured to estimate the true air speed of the UAV as a sum of the estimated wind speed and the measured ground speed of the UAV.

18. The UAV of claim 16, further comprising the processor configured to transform at least one of the modeled acceleration, the actual acceleration, or the estimated wind speed from a first coordinate system to a second coordinate system.

19. The UAV of claim 16, further comprising the processor configured to determine the measured ground speed based on at least one of inertial measurement, Global Positioning System (GPS), altitude, or acceleration data from the at least one of the sensors.

20. A non-transitory computer-readable storage medium including instructions that, when executed by a programmable processor, cause the programmable processor to:
model an acceleration of an unmanned aerial vehicle (UAV) based at least on a measured ground speed of the UAV;
determine an actual acceleration of the UAV with one or more sensors; and
estimate the speed of the wind as an integral of a difference between the modeled acceleration and the actual acceleration.

* * * * *